(12) United States Patent
Mishra et al.

(10) Patent No.: US 10,957,318 B2
(45) Date of Patent: Mar. 23, 2021

(54) DYNAMIC VOICE AUTHENTICATION

(71) Applicant: Visa International Service Association, San Francisco, CA (US)

(72) Inventors: Arjun Mishra, Doddanekundi (IN); Suman Biswas, Whitefield (IN)

(73) Assignee: Visa International Service Association, San Francisco, CA (US)

( * ) Notice: Subject to any disclaimer, the term of this patent is extended or adjusted under 35 U.S.C. 154(b) by 228 days.

(21) Appl. No.: 16/179,041

(22) Filed: Nov. 2, 2018

(65) Prior Publication Data

US 2020/0143801 A1  May 7, 2020

(51) Int. Cl.

| | |
|---|---|
| *G10L 15/22* | (2006.01) |
| *G06F 21/32* | (2013.01) |
| *G06Q 20/40* | (2012.01) |
| *G10L 15/183* | (2013.01) |
| *G10L 15/30* | (2013.01) |
| *G10L 15/16* | (2006.01) |
| *G06F 16/33* | (2019.01) |
| *G06N 3/02* | (2006.01) |

(Continued)

(52) U.S. Cl.
CPC .......... *G10L 15/22* (2013.01); *G06F 16/3344* (2019.01); *G06F 21/32* (2013.01); *G06Q 20/40145* (2013.01); *G10L 15/16* (2013.01); *G10L 15/183* (2013.01); *G10L 15/30* (2013.01); *G06N 3/02* (2013.01); *G06N 7/005* (2013.01); *G06N 7/08* (2013.01)

(58) Field of Classification Search
None
See application file for complete search history.

(56) References Cited

U.S. PATENT DOCUMENTS 5,687,287 A * 11/1997 Gandhi ................ G10L 17/14
704/247
5,774,858 A * 6/1998 Taubkin ............... B60R 25/257
704/270

(Continued)

OTHER PUBLICATIONS

Ismaili, Imdad Ali, Zeeshan Bhatti, and Azhar Ali Shah. "Towards a generic framework for the development of Unicode based digital Sindhi dictionaries." arXiv preprint arXiv:1401.2641 (2014). (Year: 2014).*

(Continued)

*Primary Examiner* — Jonathan C Kim
(74) *Attorney, Agent, or Firm* — The Webb Law Firm (57) ABSTRACT

A transaction authentication system including a vocabulary database including at least one of a dictionary's words; an utterance database including at least one speaker's utterances; at least one processor in communication with the vocabulary database and the utterance database, the at least one processor programmed or configured to digitally record an utterance from at least one speaker; isolate at least one word of he utterance based on at least one statistical analysis, one acoustic analysis, or any combination thereof; of; match at least one dictionary word from the vocabulary database with at least one word of the utterance in accordance with at least one predefined accuracy criterion; and in response to matching the at least one dictionary word with the at least one word of the utterance, transmit an authentication message.

32 Claims, 6 Drawing Sheets

(51) Int. Cl.
*G06N 7/08* (2006.01)
*G06N 7/00* (2006.01)

(56) References Cited

U.S. PATENT DOCUMENTS

| | | | | |
|---|---|---|---|---|
| 5,839,103 A * | 11/1998 | Mammone | ............. | G10L 17/10 |
| | | | | 704/232 |
| 7,386,448 B1 * | 6/2008 | Poss | ............. | G10L 17/24 |
| | | | | 379/188 |
| 8,694,315 B1 * | 4/2014 | Sheets | ............. | G06Q 20/4014 |
| | | | | 704/246 |
| 9,721,571 B2 * | 8/2017 | Lousky | ............. | G10L 17/04 |
| 10,614,813 B2 * | 4/2020 | Odinak | ............. | G10L 17/00 |
| 2002/0123882 A1 * | 9/2002 | Mohammed | ............. | G06F 40/232 |
| | | | | 704/10 |
| 2002/0152078 A1 * | 10/2002 | Yuschik | ............. | G10L 17/14 |
| | | | | 704/273 |
| 2003/0135369 A1 * | 7/2003 | Stoimenov | ............. | G06F 16/9014 |
| | | | | 704/235 |
| 2006/0069567 A1 * | 3/2006 | Tischer | ............. | G10L 13/033 |
| | | | | 704/260 |
| 2006/0149558 A1 * | 7/2006 | Kahn | ............. | G10L 15/18 |
| | | | | 704/278 |
| 2007/0239449 A1 * | 10/2007 | Luan | ............. | G10L 17/24 |
| | | | | 704/241 |
| 2008/0195389 A1 * | 8/2008 | Zhang | ............. | G10L 17/24 |
| | | | | 704/246 |
| 2009/0319270 A1 * | 12/2009 | Gross | ............. | G10L 17/04 |
| | | | | 704/246 |
| 2010/0106502 A1 * | 4/2010 | Farrell | ............. | G10L 17/00 |
| | | | | 704/246 |
| 2012/0130714 A1 * | 5/2012 | Zeljkovic | ............. | G10L 17/04 |
| | | | | 704/235 |
| 2012/0203553 A1 * | 8/2012 | Maruta | ............. | C01G 41/00 |
| | | | | 704/243 |
| 2014/0025369 A1 * | 1/2014 | Fuchs | ............. | G06F 16/30 |
| | | | | 704/9 |
| 2015/0112684 A1 * | 4/2015 | Scheffer | ............. | G10L 17/14 |
| | | | | 704/257 |
| 2015/0127342 A1 * | 5/2015 | Sharifi | ............. | G10L 25/51 |
| | | | | 704/239 |
| 2016/0225374 A1 * | 8/2016 | Rodriguez | ............. | G10L 17/10 |
| 2016/0365095 A1 * | 12/2016 | Lousky | ............. | G10L 17/04 |
| 2016/0372116 A1 * | 12/2016 | Summerfield | ............. | G10L 25/63 |
| 2018/0130473 A1 * | 5/2018 | Odinak | ............. | G10L 17/24 |
| 2018/0190269 A1 * | 7/2018 | Lokeswarappa | ............. | G09B 19/06 |
| 2018/0205726 A1 * | 7/2018 | Chari | ............. | G10L 17/02 |
| 2019/0311722 A1 * | 10/2019 | Caldwell | ............. | G10L 17/02 |
| 2020/0143801 A1 * | 5/2020 | Mishra | ............. | G10L 15/22 |

OTHER PUBLICATIONS

Adda-Decker, Martine, and Natalie D. Snoeren. "Quantifying temporal speech reduction in French using forced speech alignment." Journal of Phonetics 39.3 (2011): 261-270. (Year: 2011).*

Young, Steve J. "Statistical Modeling in Continuous Speech Recognition (CSR)." UAI. vol. 1. 2001. (Year: 2001).*

* cited by examiner

DYNAMIC VOICE AUTHENTICATION

BACKGROUND OF THE INVENTION

Field of the Invention

Provided are representative expressions of a transaction authentication system capable of authenticating a person using an utterance he or she may make.

Technical Considerations

Any company that requires knowing its customers (for example, payment, banking, insurance, benefits administration, or contract management companies) gives high importance to security to maintain the trust among its customers. Any compromise to their systems can affect millions of users and adversely affect the company's reputation. This is why authentication is a critical initial step in any of these companies' transaction processing. Authentication is a way to determine whether someone or something is, in fact, who or whatever he, she, or it claims to be.

Authentication is a process in which a person's presented credentials must match the ones stored in a company's processing system database. If they match, the user authenticates.

Today multiple authentication technologies exist, ranging from simply using usernames and passwords to using biometric recognition. Unfortunately, each is prone to attacks. The quality of simple usernames and passwords is associated with the strength of passwords chosen and the quality of protection applied to the database servers and/or files storing them. Alternatively, while biometric authentication technology can offer high levels of security, the biometric signatures are generally static and unchanged over the lifetime of the person. Voice authentication implementation is one such biometric technology with these potential limitations.

Voice authentication typically occurs in one of two ways:
1. Phrase Identification: A speaker may select a phrase or word for identification purposes. A voice recognition system may then convert the speaker's selected spoken phrase or word into text to compare against a stored textual version of that selected phrase or word. If the two texts match, the speaker may be considered authenticated.
2. Speaker Identification: A voice recognition system analyzes a speaker's utterance and matches the analyzed voice characteristics, such as modulations, pronunciations against those stored in memory to authenticate the speaker.

There are challenges associated with these traditional approaches to voice authentication. Consider two that are significant:
1. Phrase compromise: The conversion of a speaker's selected phrase or word converted to text may amount to passwords and suffer from the same limitations as passwords.
2. Mimicry artists and recording devices: Mimicry or recording artists overhearing a selected spoken phrase or word may defeat a voice recognition system by memorizing the selected word or phrase and rehearsing the voice characteristics of a speaker.

There is a need in the technological arts for providing systems and methods for implementing and processing a speaker's phrases or words that overcome these challenges.

SUMMARY OF THE INVENTION

Accordingly, and generally, it is an objective of the present disclosure to provide illustrative expressions of improved apparatus, systems, and methods embodying a transaction authentication system. Preferably provided are apparatus, systems, and methods for the dynamic voice authentication system comprising a vocabulary database, an utterance database, and at least one processor in communication with the vocabulary database and the utterance database, the processor(s) programmed or configured to match an utterance a speaker makes in the course of a transaction with one the speaker made previously.

According to a non-limiting expression, provided is a transaction authentication system comprising a transaction authentication system comprising: a vocabulary database comprised of a least one of a dictionary's words; an utterance database comprising at least one speaker's utterances; at least one processor in communication with the vocabulary database and the utterance database, the at least one processor programmed or configured to: digitally record an utterance from at least one speaker; isolate at least one word comprising the utterance based on at least one statistical analysis or one acoustic analysis or any combination thereof; isolate at least one acoustic characteristic of the utterance based on at least one statistical analysis or at least one acoustic analysis, or any combination thereof; match at least one dictionary word from the vocabulary database with at least one word of the utterance in accordance with at least one predefined accuracy criterion; match at least one acoustic characteristic with the same at least one word of the utterance; and in response to matching the at least one dictionary word with the at least one word of the utterance, transmit an authentication message.

According to another non-limiting expression of the transaction authentication system, the at least one acoustic analysis comprises a phonetic analysis to identify phones or phonemes comprising an utterance, or any combination thereof. According to a non-limiting expression of the transaction authentication system, the at least one acoustic analysis comprises an acoustic amplitude analysis, a phonetic analysis, an amplitude analysis, a temporal analysis, an energy analysis, a waveform analysis, a spatial frequency analysis, or any combination thereof.

According to another non-limiting expression of the transaction authentication system, the speaker's at least one new utterance is compared with the speaker's at least one historical utterance based only on the results of the at least one statistical model, the at least on acoustic analysis, or any combination thereof.

According to another non-limiting expression of the transaction authentication system, the at least one statistical model comprises a Markov model, a deep neural network, a language model, a Bayesian non-parametric model, or any combination thereof. According to another non-limiting expression of the transaction authentication system, at least one statistical model incorporates a beads-on-a-string model.

According to another non-limiting expression the transaction authentication system, wherein the utterance database comprises a repository that combines a hashmap and 2-D array, wherein the hashmap maintains key and value pairs in which a key represents at least one isolated word and an array comprises a row of the distinct occurrences of at least one isolated word and at least one acoustic characteristic associated with the at least one isolated word.

According to a non-limiting expression, the transaction authentication system comprises a vocabulary database comprised of: a least one of a dictionary's words; an utterance database comprising at least one speaker's utterances; at least one processor in communication with the vocabulary database and the utterance database, the at least one processor programmed or configured to: digitally record an utterance from at least one speaker; digitally generate at least one of the speaker's utterances (a "generated utterance") from the utterance database; isolate at least one word comprising the speaker's repetition of the generated utterance (a "reproduced utterance") based on at least one statistical analysis or at least one acoustic analysis, or any combination thereof; isolate at least one acoustic characteristic of the repeated utterance based on at least one statistical analysis or one acoustic analysis or any combination thereof; match at least one dictionary word from the vocabulary database with at least one word of the reproduced utterance in accordance with at least one predefined accuracy criterion; match at least one acoustic characteristic with the same at least one word of the utterance; and in response to matching the at least one dictionary word with the at least one word of the reproduced utterance, transmit an authentication message.

According to another non-limiting expression of the transaction authentication system, the at least one acoustic analysis comprises a phonetic analysis using an analog-to-digital converter to identify phones or phonemes comprising an utterance, or any combination thereof. According to another non-limiting expression of the transaction authentication system, the at least one acoustic analysis comprises an acoustic amplitude analysis, a phonetic analysis, an amplitude analysis, a temporal analysis, an energy analysis, a waveform analysis, a spatial frequency analysis, or any combination thereof.

According to another non-limiting expression of the transaction authentication system, the speaker's at least one reproduced utterance is compared with the speaker's at least one historical utterance based only on the results of the at least one statistical model, the at least on acoustic analysis, or any combination thereof.

According to another non-limiting expression of the transaction authentication system, the at least one statistical model comprises a Markov model, a deep neural network, a language model, a Bayesian non-parametric model, or any combination thereof. According to another non-limiting expression of the transaction authentication system, the at least one statistical model incorporates a beads-on-a-string model.

According to another non-limiting expression of the transaction authentication system, the utterance database comprises a repository that combines a hashmap and 2-D array, wherein the hashmap maintains key and value pairs in which a key represents at least one isolated word and an array comprises a row of the distinct occurrences of the at least one isolated word and at least one acoustic characteristic associated with the at least one isolated word.

According to another non-limiting expression of the transaction authentication system, the words comprising the at least one repeated utterance are output by the voice generation device in at least one non-grammatical order, random order, otherwise non-sequential order, or any combination thereof.

According to another non-limiting expression of the transaction authentication system, the at least one reproduced utterance must be made within at least one predefined time interval.

According to a non-limiting expression, a transaction authentication method comprises: training a speech recognition system to recognize words spoken by at least one speaker; recording at least one new utterance of the at least one speaker; analyzing by at least one statistical model, or at least one acoustic analysis, or any combination thereof the at least one new utterance of the at least one speaker to identify at least one word and at least one acoustic characteristic of the at least one new utterance of the at least one speaker; matching the at least one word and the at least one acoustic characteristic of the at least one new utterance of the at least one speaker with at least one word of at least one prior utterance of the at least one speaker stored in an utterance database based on at least one predefined accuracy criterion; in response to matching the at least one word of the at least one new utterance matches the at least one word of the at least one prior utterance based on the at least one predefined accuracy criterion determining that the at least one new utterance of the at least one speaker does or does not match the at least one prior utterance of the at least one speaker; and in response to making the match determination, transmitting an authentication message in response to determining that the at least one new utterance does or does not match the at least one prior utterance by the at least one speaker.

According to another non-limiting expression of the transaction authentication method, the at least acoustic analysis comprises a phonetic analysis using an analog-to-digital converter to identify phones or phonemes comprising an utterance, or any combination thereof. According to another non-limiting expression of the transaction authentication method, the at least one acoustic analysis comprises an acoustic amplitude analysis, a phonetic analysis, an amplitude analysis, a temporal analysis, an energy analysis, a waveform analysis, a spatial frequency analysis, or any combination thereof.

According to another non-limiting expression of the transaction authentication method, the speaker's at least one new utterance is compared with the speaker's at least one historical utterance based only on the results of the at least one statistical model, the at least on acoustic analysis, or any combination thereof.

According to another non-limiting expression of the transaction authentication method, the at least one statistical model comprises a Markov model, a deep neural network, a language model, a Bayesian non-parametric model, or any combination thereof. According to another non-limiting expression of the transaction authentication method, the at least one statistical model is a beads-on-a-string model.

According to another non-limiting expression of the transaction authentication method, the utterance database comprises a repository that combines a hashmap and 2-D array, wherein the hashmap maintains key and value pairs in which a key represents at least one isolated word and an array comprises a row of the distinct occurrences of the at least one isolated word and its at least one acoustic characteristic.

According to a non-limiting expression, a transaction authentication method comprises: identifying at least one speaker using a unique speaker identifier provided to the at least one speaker when the at least one speaker enrolls in the transaction authentication system; selecting at least one prior utterance of the at least one speaker stored in at least one utterance database; outputting at least one audible voice generated version of the selected at least one prior utterance of the at least one speaker; recording at least one reproduction by the at least one speaker of the at least one audible voice generated version of the at least one prior utterance of the at least one speaker; analyzing the at least one reproduction by at least one statistical model, or at least one acoustic analysis, or any combination thereof, to identify at least one word or at least one acoustic characteristic, or any combination thereof of the at least one reproduction of the at least one speaker; matching the at least one identified word of the at least one reproduction of the at least one speaker or the at least one acoustic characteristic of the at least one reproduction of the at least one speaker, or any combination thereof, of the at least one speaker with at least one word of at least one prior utterance of the at least one speaker stored in the at least one utterance database based on at least one predefined accuracy criterion; wherein in response to matching the at least one word of the at least one reproduction with the at least one word of the at least one prior utterance based on the at least one predefined accuracy criterion, determining that the at least one reproduction of the at least one speaker does or does not match the at least one prior utterance of the at least one speaker; and in response to making the match determination, transmitting an authentication message in response that the at least one new reproduction does or does not match the at least one prior utterance by the at least one speaker.

According to another non-limiting expression of the transaction authentication method, the at least acoustic analysis comprises a phonetic analysis using an analog-to-digital converter to identify phone or phonemes comprising an utterance, or any combination thereof. According to another non-limiting expression of the transaction authentication method, the at least one acoustic analysis comprises an acoustic amplitude analysis, a phonetic analysis, an amplitude analysis, a temporal analysis, an energy analysis, a waveform analysis, a spatial frequency analysis, or any combination thereof.

According to another non-limiting expression of the transaction authentication method, the speaker's at least one new utterance is compared with the speaker's at least one historical utterance based only on the results of the at least one statistical model, the at least on acoustic analysis, or any combination thereof.

According to another non-limiting expression of the transaction authentication method, the at least one statistical model comprises a Markov model, a deep neural network, a language model, a Bayesian non-parametric model, or any combination thereof. According to another non-limiting expression the transaction authentication system, wherein the at least one statistical model incorporates a beads-on-a-string model.

According to another non-limiting expression of the transaction authentication method, the utterance database comprises a repository that combines a hashmap and 2-D array, wherein the hashmap maintains key and value pairs in which a key represents at least one isolated word and an array comprises a row of the distinct occurrences of at least one isolated word and at least one acoustic characteristic associated with the at least one isolated word. According to another non-limiting expression of the transaction authentication method, the words comprising the at least one repeated utterance are output by the voice generation device in at least one non-grammatical order, random order, otherwise non-sequential order, or any combination thereof.

According to another non-limiting expression of the transaction authentication method, the at least one reproduced utterance must be made within at least one predefined time interval.

Further preferred and non-limiting expressions or aspects are set forth in the following numbered clauses.

Clause 1: A transaction authentication system comprising a vocabulary database comprised of a least one of a dictionary's words; an utterance database comprising at least one speaker's utterances; at least one processor in communication with the vocabulary database and the utterance database, the at least one processor programmed or configured to digitally record an utterance from at least one speaker; isolate at least one word comprising the utterance based on at least one statistical analysis or one acoustic analysis or any combination thereof; isolate at least one acoustic characteristic of the utterance based on at least one statistical analysis or at least one acoustic analysis, or any combination thereof; match at least one dictionary word from the vocabulary database with at least one word of the utterance in accordance with at least one predefined accuracy criterion; match at least one acoustic characteristic with the same at least one word of the utterance; and in response to matching the at least one dictionary word with the at least one word of the utterance, transmit an authentication message.

Clause 2: The transaction authentication system of clause 1, wherein the at least one acoustic analysis comprises a phonetic analysis to identify phones or phonemes comprising an utterance, or any combination thereof.

Clause 3: The transaction authentication system of clauses 1 or 2, wherein the at least one acoustic analysis comprises an acoustic amplitude analysis, a phonetic analysis, an amplitude analysis, a temporal analysis, an energy analysis, a waveform analysis, a spatial frequency analysis, or any combination thereof.

Clause 4: The transaction authentication system of any of clauses 1-3, wherein the speaker's at least one new utterance is compared with the speaker's at least one historical utterance based only on the results of the at least one statistical model, the at least on acoustic analysis, or any combination thereof.

Clause 5: The transaction authentication system of any of clauses 1-4, wherein the at least one statistical model comprises a Markov model, a deep neural network, a language model, a Bayesian non-parametric model, or any combination thereof.

Clause 6: The transaction authentication system of any of clauses 1-5, wherein at least one statistical model incorporates a beads-on-a-string model.

Clause 7: The transaction authentication system of any of clauses 1-6, wherein the utterance database comprises a repository that combines a hashmap and 2-D array, wherein the hashmap maintains key and value pairs in which a key represents at least one isolated word and an array comprises a row of the distinct occurrences of at least one isolated word and at least one acoustic characteristic associated with the at least one isolated word.

Clause 8: A transaction authentication system comprising a vocabulary database comprised of a least one of a dictionary's words; an utterance database comprising at least one speaker's utterances; at least one processor in communication with the vocabulary database and the utterance database, the at least one processor programmed or configured to digitally record an utterance from at least one speaker; digitally generate at least one of the speaker's utterances (a "generated utterance") from the utterance database; isolate at least one word comprising the speaker's repetition of the generated utterance (a "reproduced utterance") based on at least one statistical analysis or at least one acoustic analysis, or any combination thereof; isolate at least one acoustic characteristic of the repeated utterance based on at least one statistical analysis or one acoustic analysis or any combination thereof; match at least one dictionary word from the vocabulary database with at least one word of the reproduced utterance in accordance with at least one predefined accuracy criterion; match at least one acoustic characteristic with the same at least one word of the utterance; and in response to matching the at least one dictionary word with the at least one word of the reproduced utterance, transmit an authentication message.

Clause 9: The transaction authentication system of clause 8, wherein the at least one acoustic analysis comprises a phonetic analysis using an analog-to-digital converter to identify phones or phonemes comprising an utterance, or any combination thereof.

Clause 10: The transaction authentication system of clauses 8 or 9, wherein the at least one acoustic analysis comprises an acoustic amplitude analysis, a phonetic analysis, an amplitude analysis, a temporal analysis, an energy analysis, a waveform analysis, a spatial frequency analysis, or any combination thereof.

Clause 11: The transaction authentication system of any of clauses 8-10, wherein the speaker's at least one reproduced utterance is compared with the speaker's at least one historical utterance based only on the results of the at least one statistical model, the at least on acoustic analysis, or any combination thereof.

Clause 12: The transaction authentication system of any of clauses 8-11, wherein the at least one statistical model comprises a Markov model, a deep neural network, a language model, a Bayesian non-parametric model, or any combination thereof.

Clause 13: The transaction authentication system of any of clauses 8-12, wherein the at least one statistical model incorporates a beads-on-a-string model.

Clause 14: The transaction authentication system of any of clauses 8-13, wherein the utterance database comprises a repository that combines a hashmap and 2-D array, wherein the hashmap maintains key and value pairs in which a key represents at least one isolated word and an array comprises a row of the distinct occurrences of the at least one isolated word and at least one acoustic characteristic associated with the at least one isolated word.

Clause 15: The transaction authentication system of any of clauses 8-14, wherein the words comprising the at least one repeated utterance are output by the voice generation device in at least one non-grammatical order, random order, otherwise non-sequential order, or any combination thereof.

Clause 16: The transaction authentication system of any of clauses 8-15, wherein the at least one reproduced utterance must be made within at least one predefined time interval.

Clause 17: A transaction authentication method, comprising training a speech recognition system to recognize words spoken by at least one speaker; recording at least one new utterance of the at least one speaker; analyzing by at least one statistical model, or at least one acoustic analysis, or any combination thereof the at least one new utterance of the at least one speaker to identify at least one word and at least one acoustic characteristic of the at least one new utterance of the at least one speaker; matching the at least one word and the at least one acoustic characteristic of the at least one new utterance of the at least one speaker with at least one word of at least one prior utterance of the at least one speaker stored in an utterance database based on at least one predefined accuracy criterion; in response to matching the at least one word of the at least one new utterance matches the at least one word of the at least one prior utterance based on the at least one predefined accuracy criterion, determining that the at least one new utterance of the at least one speaker does or does not match the at least one prior utterance of the at least one speaker; and in response to making the match determination, transmitting an authentication message in response to determining that the at least one new utterance does or does not match the at least one prior utterance by the at least one speaker.

Clause 18: The transaction authentication method of clause 17, wherein the at least acoustic analysis comprises a phonetic analysis using an analog-to-digital converter to identify phones or phonemes comprising an utterance, or any combination thereof.

Clause 19: The transaction authentication method of clauses 17 or 18, wherein the at least one acoustic analysis comprises an acoustic amplitude analysis, a phonetic analysis, an amplitude analysis, a temporal analysis, an energy analysis, a waveform analysis, a spatial frequency analysis, or any combination thereof.

Clause 20: The transaction authentication method of any of clauses 17-19, wherein the speaker's at least one new utterance is compared with the speaker's at least one historical utterance based only on the results of the at least one statistical model, the at least on acoustic analysis, or any combination thereof.

Clause 21: The transaction authentication method of any of clauses 17-20, wherein the at least one statistical model comprises a Markov model, a deep neural network, a language model, a Bayesian non-parametric model, or any combination thereof.

Clause 22: The transaction authentication method of any of clauses 17-21, wherein the at least one statistical model is a beads-on-a-string model.

Clause 23: The transaction authentication method of any of clauses 17-22, wherein the utterance database comprises a repository that combines a hashmap and 2-D array, wherein the hashmap maintains key and value pairs in which a key represents at least one isolated word and an array comprises a row of the distinct occurrences of the at least one isolated word and its at least one acoustic characteristic.

Clause 24: A transaction authentication method comprising identifying at least one speaker using a unique speaker identifier provided to the at least one speaker when the at least one speaker enrolls in the transaction authentication system; selecting at least one prior utterance of the at least one speaker stored in at least one utterance database; outputting at least one audible voice generated version of the selected at least one prior utterance of the at least one speaker; recording at least one reproduction by the at least one speaker of the at least one audible voice generated version of the at least one prior utterance of the at least one speaker; analyzing the at least one reproduction by at least one statistical model, or at least one acoustic analysis, or any combination thereof, to identify at least one word or at least one acoustic characteristic, or any combination thereof of the at least one reproduction of the at least one speaker; matching the at least one identified word of the at least one reproduction of the at least one speaker or the at least one acoustic characteristic of the at least one reproduction of the at least one speaker, or any combination thereof, of the at least one speaker with at least one word of at least one prior utterance of the at least one speaker stored in the at least one utterance database based on at least one predefined accuracy criterion; wherein in response to matching the at least one word of the at least one reproduction with the at least one word of the at least one prior utterance based on the at least one predefined accuracy criterion, determining that the at least one reproduction of the at least one speaker does or does not match the at least one prior utterance of the at least one speaker; and in response to making the match determination, transmitting an authentication message in response that the at least one new reproduction does or does not match the at least one prior utterance by the at least one speaker.

Clause 25: The transaction authentication method of clause 24, wherein the at least one acoustic analysis comprises a phonetic analysis using an analog-to-digital converter to identify phone or phonemes comprising an utterance, or any combination thereof.

Clause 26: The transaction authentication method of clauses 24 or 25, wherein the at least one acoustic analysis comprises an acoustic amplitude analysis, a phonetic analysis, an amplitude analysis, a temporal analysis, an energy analysis, a waveform analysis, a spatial frequency analysis, or any combination thereof.

Clause 27: The transaction authentication method of clauses 24-26, wherein the speaker's at least one new utterance is compared with the speaker's at least one historical utterance based only on the results of the at least one statistical model, the at least on acoustic analysis, or any combination thereof.

Clause 28: The transaction authentication method of any of clauses 24-27, wherein the at least one statistical model comprises a Markov model, a deep neural network, a language model, a Bayesian non-parametric model, or any combination thereof.

Clause 29: The transaction authentication method of any of clauses 24-28, wherein the at least one statistical model incorporates a beads-on-a-string model.

Clause 30: The transaction authentication method of any of clauses 24-29, wherein the utterance database comprises a repository that combines a hashmap and 2-D array, wherein the hashmap maintains key and value pairs in which a key represents at least one isolated word and an array comprises a row of the distinct occurrences of at least one isolated word and at least one acoustic characteristic associated with the at least one isolated word.

Clause 31: The transaction authentication method of any of clauses 24-30, wherein the words comprising the at least one repeated utterance are output by the voice generation device in at least one non-grammatical order, random order, otherwise non-sequential order, or any combination thereof.

Clause 32: The transaction authentication method of any of clauses 24-31, wherein the at least one reproduced utterance must be made within at least one predefined time interval.

BRIEF DESCRIPTION OF THE DRAWINGS

The drawings incorporated herein illustrate one or more expressions of the transaction authentication system apparatus, systems, and methods and help explain different aspects of the one or more expressions of the same. As such, the drawings are not to be viewed as limiting any one aspect of any expression of the transaction authentication system's apparatus, systems and methods. In the drawings.

DESCRIPTION OF THE PREFERRED EXPRESSIONS

It is to be understood that the dynamic voice actuation system may assume various alternative variations and step sequences, except where expressly specified to the contrary. It is also to be understood that the devices and processes illustrated in the attached drawings, and described in the following specification, are simply exemplary expressions or aspects of the dynamic voice actuation system. Hence, specific dimensions and other physical characteristics related to the expressions or aspects disclosed herein are not to be considered as limiting.

As used through out this application the term "device" refers to hardware or software that may host and/or execute one or more separate software, one or more software-as-a service applications, or one or more computational or algorithmic software functions or routines, or any combination thereof.

Figure 1:
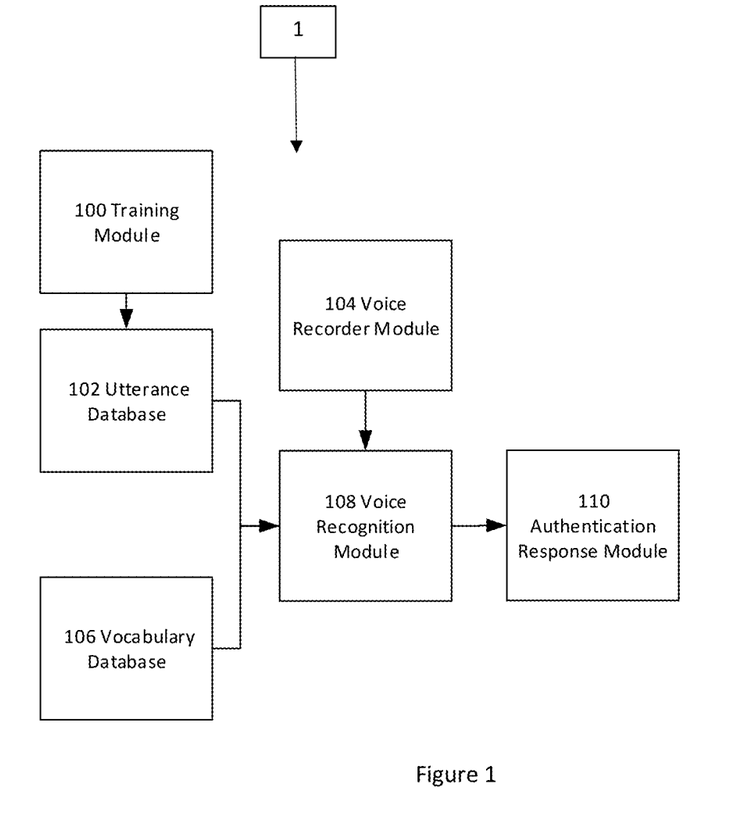
FIG. 1 is a non-limiting expression or aspect of a dynamic voice authentication system according to the principles of the present invention.

According to one non-limiting expression or aspect, FIG. 1 provides a schematic of an archtectural view of a transaction authentication system 1 comprised of a training device 100, an utterance database 102, a vocabulary database 106, a voice recorder device 104, a voice recognition device 108, and an authentication message device 110.

Further to describing FIG. 1, the vocabulary database 106 stores at least one word (which is assumed to comprise at least one spelling of the word(s) and/or at least one phonetic characteristic of the word(s) from a standard dictionary, for example, an Oxford English, Cambridge or Merriam-Webster dictionary. The number of words comprising the vocabulary database 106 may affect the computational complexity and accuracy of the transaction authentication system 1 and a second representative transaction authentication system 2 described below.

The voice recorder 104 of FIG. 1 translates the analog wave comprising a speaker's one or more utterances into a digital data format that may be used by the recognition device 108. The digital format allows the recognition device 108 to use one or more statistical models and/or one or more acoustic analyses to analyze a speaker's utterance(s). The statistical model(s) and/or the acoustical analysis(es) produce one or more acoustic characteristics associated with the speaker's utterance(s) and/or identify at least one phone and/or phoneme within the speaker's utterance(s), which in turn may be used by the recognition device 108 to process and isolate the one or more words comprising the speaker's utterance(s), match it with the word(s) stored in the vocabulary database 106, and thereby identify the word(s) comprising the speaker's utterance(s).

Further referring to recognition device 108, it uses statistical model(s) comprising Markov models, deep neural networks, language models and/or Bayesian non-parametric models, or any combination thereof. It may also use the acoustic analysis(es) comprising waveform analysis(es) comprising one or more of spectrum, waveform, and/or Fourier analysis(es), amplitude analysis(es), temporal analysis(es), energy analysis(es), phonetic analysis(es), or any combination thereof.

The authentication message device 110 receives the results of the recognition device 108 determines whether the results received may or may not satisfy a predefined recognition threshold, and in response to which it creates a message recommending either the acceptance or rejection of the speaker's intended transaction, respectively.

Using the recorder device 104, recognition device 108, the vocabulary database 106, and (each described in more detail below), the statistical model(s) and/or acoustic analysis(es) may identify the speaker's words comprising the speaker's utterance(s) and/or the acoustic characteristics of the speaker's pronunciation of the utterance(s). The training device 100 communicates the recognition device's 108 results to the speaker, to which the speaker indicates whether the training system did or did not recognize the utterance(s) according to one ore more predefined accuracy criteria, such as correctly outputting M of N words, attaining a predefined probability of the output's word sequences, confirming that the results of the acoustic characteristics of the prior utterances within one or more acceptable ranges or distributions, or any combination thereof. The output of the training device 100 may be textual and/or voice generated depending on the output capability of the transaction authentication system 1 or 2. The speaker's indication that the output was or was not accurate may comprise an oral or textual input, depending on the capability of the transaction authentication system 1 or 2.

The transaction authentication system 1 or 2 training may occur in a noisy environment with or without noise filtering to promote achieving the predefined accuracy criteria under everyday normal environmental conditions.

The speaker's accurately recognized utterance(s) are stored in the utterance database 102, the structure of which is described below. These utterance(s) comprise the speaker's "prior utterance(s)."

The described training continues until the utterance database 102 stores a specific predefined number of prior utterances for the speaker. At that point the machine learning maintains and updates the utterance database 102 for the speaker. Until the predefined number of the speaker's prior utterances are stored in the utterance database 102, the transaction authentication systems 1 and 2 are not used independently of one or more other authentication methods that may be used to authenticate the speakers. These other authentication methods may comprise one or more of the following: a pre-established password, a biometric (for example, but not limited to, fingerprint recognition, a retenal scan, or facial recognition), a PIN, and password. Once the predefined number of stored prior utterance(s) for the speaker are met, the transaction authentication system may be used independently of and/or in lieu of the other authentication methods.

The voice recorder 104 captures the prior utterances of the speaker during the training phase. Once the transaction authentication system 1 or 2 is trained, the voice recorder 104 captures the speaker's utterances made at the time of a transaction. These are one or more "new utterances" that may be used to authenticate the speaker at the time of a transaction. The new utterance(s) made by the speaker may either be the same as the speaker's prior utterances or not. The non-limiting expression or aspect of the transaction authentication system does not assume that any one specific prior utterance of the speaker is required to authenticate the speaker.

When the utterance database 102 stores the predefined number of prior utterances for the speaker and the transaction authentication system authenticates the speaker when the speaker conducts a transaction, the recognition device 108 matches the results of the statistical model(s) and/or the acoustic analysis(es) of the speaker's new utterances with the prior utterance(s) of the speaker that are stored in the utterance database 102. The accuracy criteria required for matching the new utterance(s) with the prior utterance(s) may be the same as or different from the accuracy criteria used for training. The matching results may be sent to the authentication output device 110. If a match satisfies the predefined accuracy criteria, the speaker is authenticated, in response to which the authentication message device 110 may output a match message and the transaction may be approved. If a match does not satisfy the predefined accuracy criteria, then the speaker is not authenticated and the authentication message device 110 may output a mismatch message and the transaction may be declined. The match or mismatch message may be a textual or a voice generated output depending on the capabilities of the transaction authentication system 1 or 2.

The matching performed by recognition device 108 may comprise one or more linguistic, mathematical, or computational techniques, including but not limited to pattern matching (where at least one word, utterance, and/or speaker may be recognized entirely), feature analysis(es) (in which a phoneme or acoustic characteristic of the at least one word, utterance or speaker may be recognized), language modeling, statistical analysis(es) (whereby grammatical rules and probabilities of phoneme and/or word sequences are used to accelerate recognition and improve accuracy), or neural networks (models that may reliably recognize patterns, such as among phonemes and/or acoustic characteristics), or any combination thereof.

Figure 2:
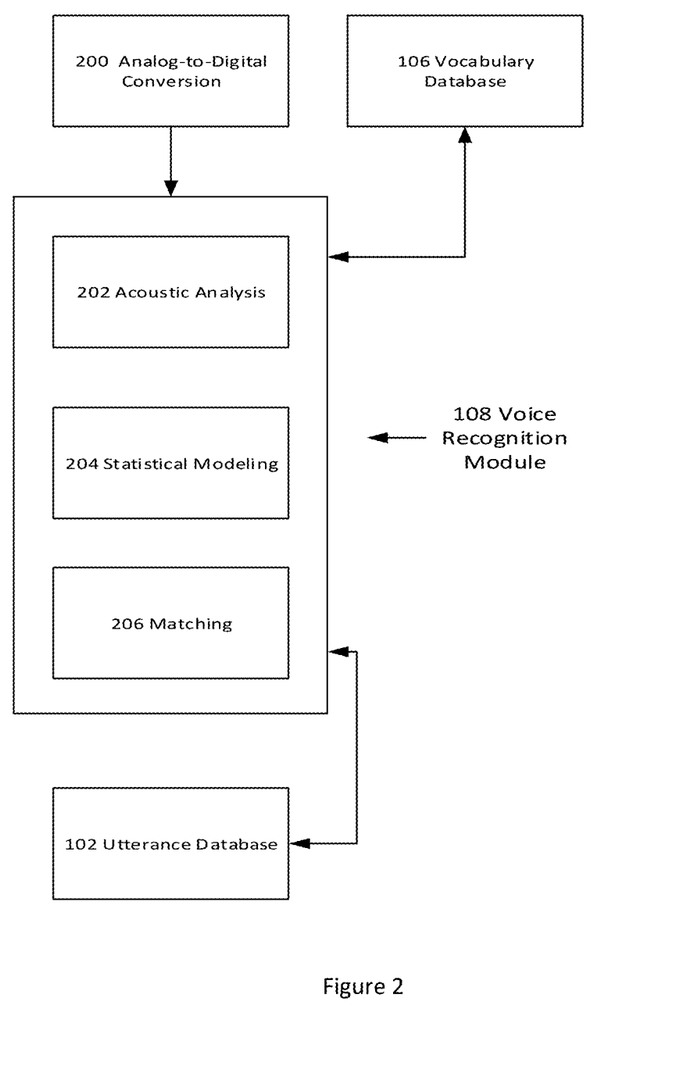
FIG. 2 is a non-limiting expression or aspect of a process used to train a voice recognition system and to analyze and or match a speaker's utterances according to the principles of the present invention.

In a non-limiting expression or aspect, FIG. 2 summarizes the described training. The recorder device 104 employs an analog-to-digital conversion 200. The recognition device 108 includes, but may not be limited to, the one or more acoustic analyses 202, the one or more statistical models 204, and the one or more matching techniques 206. The recognition device 108 interacts with the vocabulary database 106 and the utterance database 102 to determine if the recognition device's 108 word isolation, acoustic, and/or phonetic results match one or more of the words in the vocabulary database 106 within the predefined accuracy criteria. If the results satisfy the predefined accuracy criteria, the recognition result is provided to the speaker, in response to which the speaker creates a speaker response 208 that is returned to the training system. The speaker response 208 indicates whether the recognition result is correct or not. If the speaker response 208 indicates that the recognition response is correct, the speaker's utterance is stored in utterance database 102 as one of the the speaker's stored prior utterance(s). If the speaker response 208 indicates that the recognition response is not correct, it is not stored in utterance database 102 as one of the speaker's stored prior utterances.

Figure 3:
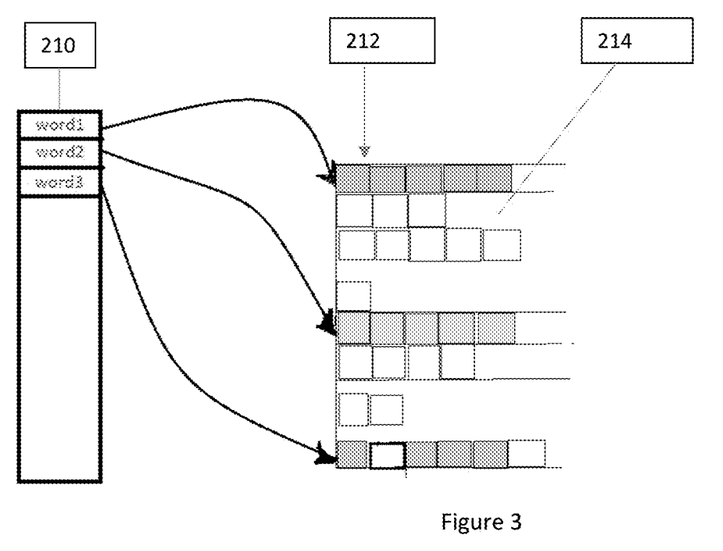
FIG. 3 is a non-limiting expression or aspect of a database structure of a dynamic authentication system according to the principles of the present invention.

In another non-limiting expression or aspect, FIG. 3 illustrates a data structure of the utterance database 102. The words comprising the speaker's stored utterances are stored in the utterance database 102 as a combination of a hashmap and a 2-D array. The hashmap maintains a key and value pair, which may be denoted as HashMap (K,V). A list 210 comprises one or more keys (Ks), which are the words themselves, and one or more values (Vs), which point to one or more rows 212 in a 2-D array 212 that store all the distinct occurrences of the words spoken by the user. If one of the words already exists, then the word and the one or more one acoustic characteristics of the word are matched with the stored occurrences in the appropriate row(s). If the acoustic characteristics of the word do not match any of the words already stored, then a new entry is added to the row(s) for the word. Alternatively, if the word does not exist in the hashmap, then a new entry is added to list 210 and array 212 with the word as a key in list 210 for a newly allocated row in 2-D array 212 where the acoustic characteristics of the word are added.

The size of utterance database 102 may be directly proportional to the amount of training that occurs. The more a speaker interacts with transaction authentication system 1 or 2, the number of words and/or the one acoustic characteristics stored with the words increases. Such increases add to the number of utterances that may be used by and the precision with which the transaction authentication system 1 or 2 may authenticate the speaker.

Figure 4:
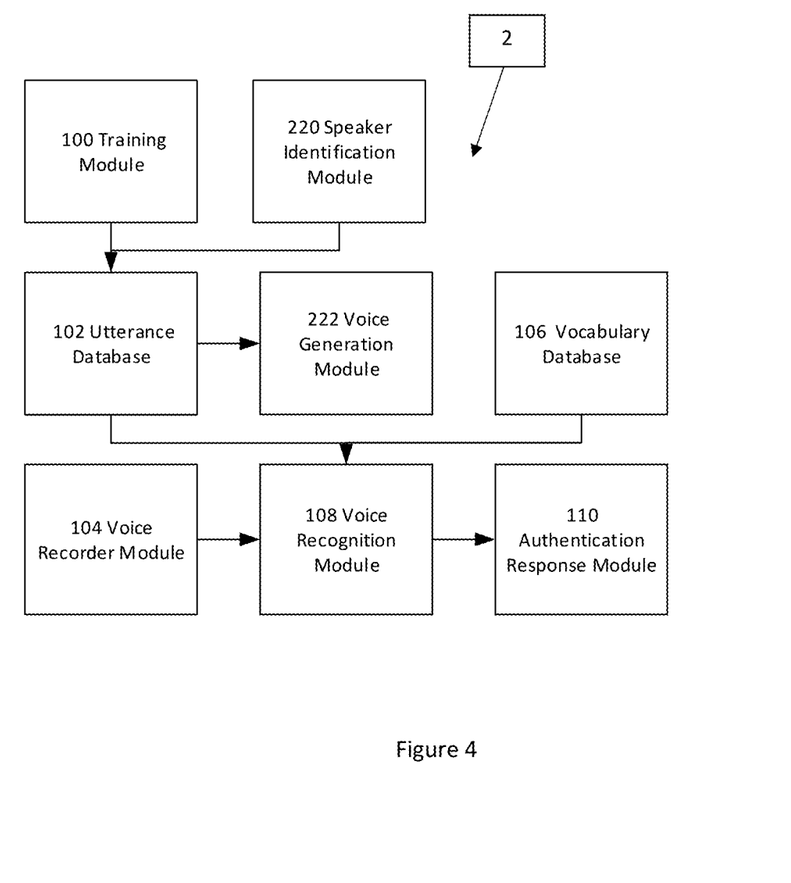
FIG. 4 is a non-limiting expression or aspect of a dynamic voice authentication system according to the principles of the present invention.

In one non-limiting expression or aspect, FIG. 4 provides a schematic of an alternate architectural view of a transaction authentication system 2, comprising speaker identification device 220 and voice generation device 222 added to the devices and databases appearing in FIG. 1 as a representative expression of transaction authentication system 1. In the transaction authentication system 2, the speaker identification device 220 stores a unique speaker identification (ID) for each speaker. The ID typically may be alphabetic, numeric, or alphanumeric, but it may also represent an image or photographic element. Each speaker enters their unique speaker ID into speaker identification device 220 each time they interact with the transaction authentication system 2. Transaction authentication system 2 uses the speaker's unique ID when the system is being trained for the speaker and when it, post training, authenticates the speaker when conducting a transaction.

If the speaker ID for the speaker is entered verbally by the speaker, it becomes one of the utterances for which the transaction authentication system must be trained so that it may be digitally stored accurately in the speaker identification device 220. If it is entered by the speaker textually, it is stored digitally in speaker identification device 220.

Transaction authentication system 2 training is the same as for transaction authentication system 1. When transaction authentication system 2 satisfies the predefined accuracy criteria to authenticate the speaker, it switches its mode of operation to authenticate the speaker. At that time when the speaker enters their unique speaker ID to conduct a transaction, the system accesses the utterance database 102 to select a prior utterance of the speaker. The selected prior utterance may be input to the voice generation device 222, in response to which it generates the prior utterance in an audible form that may be heard by the speaker conducting the transaction. In response to the voice generation device 222 output, the speaker repeats it within a predefined time. The recorder device 104 captures and digitizes the repeated utterance as a new utterance, in response to which recognition device 108 analyzes it and determines that the new utterance either matches the selected prior utterance within the predefined accuracy criteria or not. Recognition device 108 sends the result to the authentication message device 110, which outputs an authentication message if there is a match or a mismatch message if there is a mismatch. The authentication output may be in a textual or a voice generated format, or both.

The method by which the speaker's prior utterances may be selected may take any number of forms, including, but not limited to, one or more of the following: a random selection; a time-based selection by which a selection must be at least a predefined time-period hold; or a frequency of use selection, by which a selection is selected when it may either use the at least one word or a set of words has been used either above or below a specified predetermined frequency-of-use threshold.

In another non-limiting expression or aspect of the transaction authentication system 2 represented in FIG. 4, the words comprising the selected new utterance output by the voice generation system and repeated by the speaker may be output in a non-grammatical, random, or otherwise non-sequential order. In this expression, the output retains each word's acoustic characteristics stored in the utterance database 102 according to the data structure described in FIG. 3 for utterance database 102. Because the acoustic characteristics are expected to vary from what they might have been had the words had be spoken in isolation or as part of the grammatical utterance, the described output may make it difficult for mimicry and recording artists to replicate the utterance with sufficient accuracy to be falsely authenticated.

The voice generation device 222 may include, but not be limited to, one or more known voice synthesis technologies such as concatenation synthesis (which joins segments of recorded speech), format synthesis (which uses acoustic models), articulatory synthesis (which may model the human vocal tract), Markov model synthesis (which models the frequency spectrum and duration of speech), sinewave synthesis (which may replace formants with pure tones), or any combination thereof.

Figure 5:
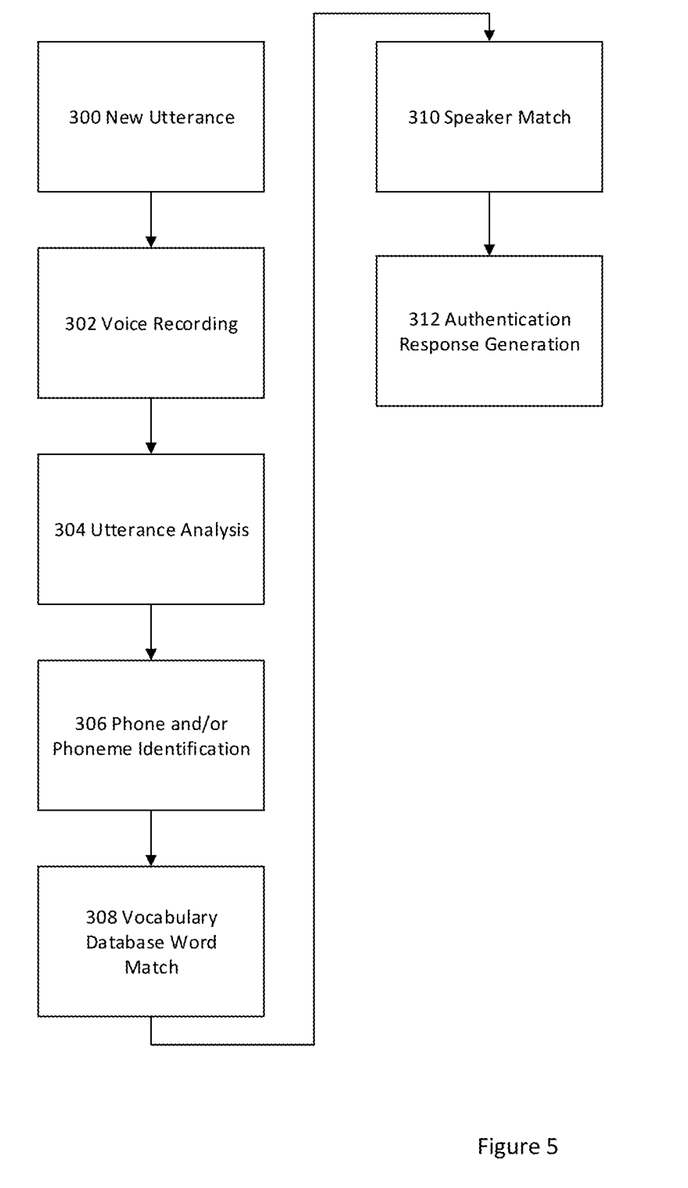
FIG. 5 is a non-limiting expression or aspect of a process performed by the transaction authentication system according to the principles of the present invention.

In one non-limiting expression or aspect, FIG. 5 represents a method by which transaction authentication may occur once the transaction authentication system 1 is trained for the speaker using it. For the transaction authentication system 1, an authentication may begin with the speaker uttering one or more new utterances 300. In response to a new utterance, the voice recorder device 104 makes a digital voice recording 302. The voice recognition device 108 then performs utterance analysis 304 of the voice recording 302. The utterance analysis 304 comprises the statistical model(s) and/or acoustic analysis(es) described for and represented in FIG. 2. Based on a result of the statistical model(s) and/or the acoustic analysis(es), the voice recognition device identifies one or more phones and/or phonemes 306 that may comprise the new utterance and that that may produce a vocabulary database word match 308 within the vocabulary database 106. The vocabulary database word match 308, in conjunction with the acoustic characteristics associated with the analyzed new utterance, are then compared to the speaker's prior utterances stored in the utterance database 102 to determine if there is at least one speaker match 310 that meets one or more of the predefined accuracy criteria described above. The result of the determination is sent to the authentication message generation device 110 to further generate and output an authentication message 312. The authentication message 312 authenticates the speaker if the speaker match 310 meets the predefined accuracy criteria and does not authenticate the speaker if the speaker match 310 does not meet the predefined accuracy criteria.

Figure 6:
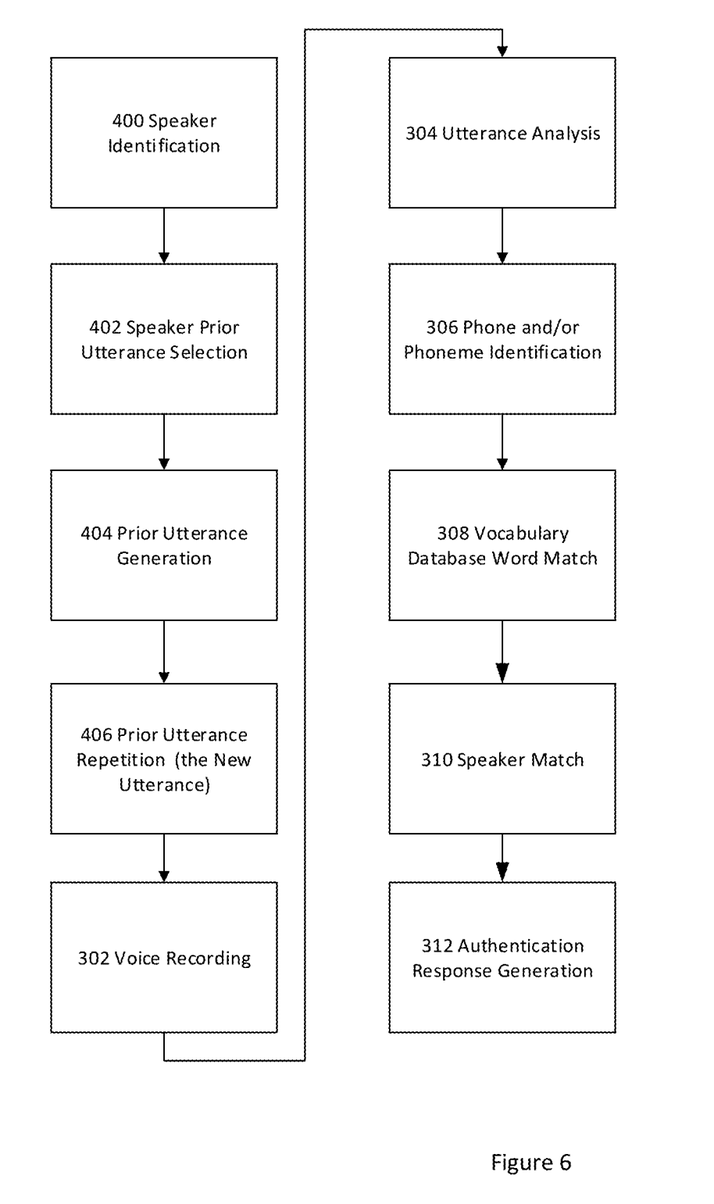
FIG. 6 is a non-limiting expression or aspect of a process performed by the transaction authentication system according to the principles of the present invention.

FIG. 6 shows another non-limiting expression or aspect of a transaction authentication method using the architecture of the transaction authentication system 2. It again assumes that the transaction authentication system 2 is trained for the speaker using it. Such a method applies to a situation in which the transaction authentication system 2 selects and generates a voice output comprising a prior utterance of the speaker that the speaker must reproduce as a new utterance that the transaction authentication system 2 records and analyzes and for which it generates an authentication message. The method uses the voice recording 302, the utterance analysis 304, the phone(s) and/or phoneme(s) identification 306, the vocabulary database word match 310, and the authentication message generation 312 as previously described. Descriptions of these elements are not repeated for FIG. 6.

The new elements FIG. 6 introduces are a speaker ID 400, a speaker prior utterance selection 402, a prior utterance generation 404, and a prior utterance repetition 406. A speaker registered in or with the transaction authentication system 2 enters their speaker ID 400 into the transaction authentication system's 2 speaker identification device 220 when a transaction is to be conducted. Based on the speaker ID 400, the transaction authentication system 2 selects at least one prior utterance 402 of the speaker from the utterance database 102, in response to which the voice generation device 222 outputs the prior utterance generation 404 for the speaker to repeat into the voice recorder device 108 as the new utterance 406. The voice recorder device 104 records the new utterance 406 as the voice recording 302. The voice recording 302 is the input operated by the transaction authentication system devices to produce the utterance analysis 304, the phone(s) and/or phoneme(s) identification 306, a vocabulary database word match 310, and ultimately produces to the authentication message generation 312.

In a non-limiting expression of the method described in FIG. 6, it may be possible for the transaction authentication system 2 to authenticate the speaker with a speaker ID 400 solely by matching the results of the statistical model(s) and/or acoustic analysis(es) of the prior utterance repetition 406 made by the speaker with the results of the statistical model(s) and/or acoustic analysis(es) of the selected at least one prior utterance 402 for that speaker stored in utterance database 102. In this non-limiting expression, the need to perform a vocabulary database word match 308 may not be necessary.

Although the transaction authentication system has been described in detail for the purpose of illustration based on what is currently considered to be the most practical and preferred expressions, it is to be understood that such detail is solely for that purpose and that the transaction authentication system is not limited to the disclosed expressions, but, on the contrary, is intended to cover modifications and equivalent arrangements that are within the spirit and scope of the appended claims. For example, it is to be understood that the present transaction authentication system contemplates that, to the extent possible, one or more features of any expression can be combined with one or more features of any other expression.

Two use cases illustrate the advantages of the types of transaction authentication system non-limiting expressions or aspects that have been described:
 1. A handsfree mobile payment
 2. Secure access for the visually impaired
Handsfree Mobile Payment Bills may be paid using cash, a mobile application, and/or a credit or debit card. If one is in a car at a gas station and or fast food restaurant, these may not be the most convenient ways to pay. The person may not want to enter the restaurant to wait for his order and then pay. With the transaction authentication system 1 or 2 the person may use any mobile phone application or any voice activated payment system that has been integrated on the transaction authentication system 1 or 2. Once the transaction is initiated, and assuming that the training phase has been successfully completed, the speaker need only utter a new utterance to be authenticated.
Secure Access for the Visually Impaired If a blind person is required to enter a PIN/passcode for gaining access to a premise, it may become difficult if he or she has to manually enter a password or code. If the keypad has Braille instructions, such inputs may be facilitated, but it may still not be as convenient or secure as it might otherwise be. Consider if someone is tailgating. The tailgater might get to know the password or code just by looking a person's entry of them into the access system. If the access system is integrated with the the transaction authentication system 1 or 2 (the latter not requiring a manual input of the speakers ID), the visually impaired person may train it over time in conjunction with one of the described alternate methods and then, once trained, rely only on the authentication that the transaction authentication system 1 or 2 provides.

The invention claimed is:

1. A transaction authentication system comprising:
 a vocabulary database comprised of a least one of a dictionary's words;
 an utterance database comprising at least one speaker's utterance;
 at least one processor in communication with the vocabulary database and the utterance database, the at least one processor programmed or configured to:
  digitally record an utterance from at least one speaker;
  isolate at least one isolated word comprising the utterance based on at least one statistical model or at least one acoustic analysis or any combination thereof, wherein the at least one isolated word of the utterance is not predefined in the utterance database;
  isolate at least one acoustic characteristic of the utterance based on the at least one statistical model, the at least one acoustic analysis, or any combination thereof;
  match at least one dictionary word from the vocabulary database with the at least one isolated word of the utterance in accordance with at least one predefined accuracy criterion;
  match the at least one acoustic characteristic with the at least one isolated word of the utterance; and
  in response to matching the at least one dictionary word with the at least one isolated word of the utterance, transmit an authentication message and add the at least one isolated word of the utterance to the utterance database, wherein the utterance database comprises a repository that combines a hashmap and a 2-D array, wherein the hashmap maintains key and value pairs in which a key represents the at least one isolated word from a plurality of isolated words, and the 2-D array comprises a row of distinct occurrences of the at least one isolated word and the at least one acoustic characteristic associated with the at least one isolated word.

2. The transaction authentication system of claim 1, wherein the at least one acoustic analysis comprises a phonetic analysis to identify phones or phonemes comprising an utterance.

3. The transaction authentication system of claim 1, wherein the at least one acoustic analysis comprises an acoustic amplitude analysis, a phonetic analysis, an amplitude analysis, a temporal analysis, an energy analysis, a waveform analysis, a spatial frequency analysis, or any combination thereof.

4. The transaction authentication system of claim 1, wherein the new utterance is compared with the at least one speaker's utterance based only on results of the at least one statistical model, the at least one acoustic analysis, or any combination thereof.

5. The transaction authentication system of claim 1, wherein the at least one statistical model comprises a Markov model, a deep neural network, a language model, a Bayesian non-parametric model, or any combination thereof.

6. The transaction authentication system of claim 1, wherein the at least one statistical model incorporates a beads-on-a-string model.

7. The transaction authentication system of claim 1,
wherein if the at least one isolated word of the utterance does not match any of the plurality of isolated words in the utterance database, then a new key is added to the hashmap and the at least one acoustic characteristic of the new key is added to the 2-D array; and
wherein if the at least one isolated word of the utterance matches one of the plurality of isolated words, and the at least one acoustic characteristic of the at least one isolated word of the utterance does not match any of the at least one acoustic characteristic associated with the plurality of isolated words, then the at least one acoustic characteristic of the at least one isolated word of the utterance is added to the row of distinct occurrences of the 2-D array for the matched at least one isolated word.

8. A transaction authentication system comprising:
a vocabulary database comprised of a least one of a dictionary's words;
an utterance database comprising at least one speaker's utterance;
at least one processor in communication with the vocabulary database and the utterance database, the at least one processor programmed or configured to:
digitally record an utterance from at least one speaker;
digitally generate at least one of the speaker's utterances from the utterance database, resulting in a generated utterance;
isolate at least one isolated word comprising a speaker's repetition of the generated utterance, resulting in a reproduced utterance, based on at least one statistical model or at least one acoustic analysis, or any combination thereof, wherein the at least one isolated word of the reproduced utterance is not pre-defined in the utterance database;
isolate at least one acoustic characteristic of the reproduced utterance based on the at least one statistical model or the at least one acoustic analysis or any combination thereof;
match at least one dictionary word from the vocabulary database with the at least one isolated word of the reproduced utterance in accordance with at least one predefined accuracy criterion;
match the at least one acoustic characteristic with the at least one isolated word of the utterance; and
in response to matching the at least one dictionary word with the at least one isolated word of the reproduced utterance, transmit an authentication message and add the at least one isolated word of the utterance to the utterance database, wherein the utterance database comprises a repository that combines a hashmap and a 2-D array, wherein the hashmap maintains key and value pairs in which a key represents the at least one isolated word from a plurality of isolated words and the 2-D array comprises a row of distinct occurrences of the at least one isolated word and the at least one acoustic characteristic associated with the at least one isolated word.

9. The transaction authentication system of claim 8, wherein the at least one acoustic analysis comprises a phonetic analysis using an analog-to-digital converter to identify phones or phonemes comprising an utterance.

10. The transaction authentication system of claim 8, wherein the at least one acoustic analysis comprises an acoustic amplitude analysis, a phonetic analysis, an amplitude analysis, a temporal analysis, an energy analysis, a waveform analysis, a spatial frequency analysis, or any combination thereof.

11. The transaction authentication system of claim 8, wherein the utterance is compared with the at least one speaker's utterance based only on results of the at least one statistical model, the at least one acoustic analysis, or any combination thereof.

12. The transaction authentication system of claim 8, wherein the at least one statistical model comprises a Markov model, a deep neural network, a language model, a Bayesian non-parametric model, or any combination thereof.

13. The transaction authentication system of claim 8, wherein the at least one statistical model incorporates a beads-on-a-string model.

14. The transaction authentication system of claim 8,
wherein if the at least one isolated word of the utterance does not match any of the plurality of isolated words in the utterance database, then a new key is added to the hashmap and the at least one acoustic characteristic of the new key is added to the 2-D array; and
wherein if the at least one isolated word of the utterance matches one of the plurality of isolated words, and the at least one acoustic characteristic of the at least one isolated word of the utterance does not match any of the at least one acoustic characteristic associated with the plurality of isolated words, then the at least one acoustic characteristic of the at least one isolated word of the utterance is added to the row of distinct occurrences of the 2-D array for the matched at least one isolated word.

15. The transaction authentication system of claim 8, wherein the isolated words comprising the at least one reproduced utterance are output by a voice generation device in at least one non-grammatical order, random order, otherwise non-sequential order, or any combination thereof.

16. The transaction authentication system of claim 8, wherein the at least one reproduced utterance must be made within at least one predefined time interval.

17. A transaction authentication method, comprising:
training a speech recognition system to recognize words spoken by at least one speaker;
recording at least one new utterance of the at least one speaker;
analyzing by at least one statistical model, at least one acoustic analysis, or any combination thereof, the at least one new utterance of the at least one speaker to identify at least one isolated word and at least one acoustic characteristic of the at least one new utterance of the at least one speaker, wherein the at least one isolated word of the utterance is not predefined in an utterance database;
matching the at least one isolated word and the at least one acoustic characteristic of the at least one new utterance of the at least one speaker with at least one word of at least one prior utterance of the at least one speaker stored in the utterance database based on at least one predefined accuracy criterion;

in response to matching the at least one isolated word of the at least one new utterance matches the at least one word of the at least one prior utterance based on the at least one predefined accuracy criterion, determining that the at least one new utterance of the at least one speaker does or does not match the at least one prior utterance of the at least one speaker; and in response to making the match determination, transmitting an authentication message in response to determining that the at least one new utterance does or does not match the at least one prior utterance by the at least one speaker and add the at least one isolated word of the utterance to the utterance database, wherein the utterance database comprises a repository that combines a hashmap and a 2-D array, wherein the hashmap maintains key and value pairs in which a key represents the at least one isolated word from a plurality of isolated words and the 2-D array comprises a row of distinct occurrences of the at least one isolated word and at least one acoustic characteristic associated with the at least one isolated word.

18. The transaction authentication method of claim 17, wherein the at least one acoustic analysis comprises a phonetic analysis using an analog-to-digital converter to identify phones or phonemes comprising an utterance.

19. The transaction authentication method of claim 17, wherein the at least one acoustic analysis comprises an acoustic amplitude analysis, a phonetic analysis, an amplitude analysis, a temporal analysis, an energy analysis, a waveform analysis, a spatial frequency analysis, or any combination thereof.

20. The transaction authentication method of claim 17, wherein the utterance is compared with the at least one speaker's utterance based only on results of the at least one statistical model, the at least one acoustic analysis, or any combination thereof.

21. The transaction authentication method of claim 17, wherein the at least one statistical model comprises a Markov model, a deep neural network, a language model, a Bayesian non-parametric model, or any combination thereof.

22. The transaction authentication method of claim 17, wherein the at least one statistical model is a beads-on-a-string model.

23. The transaction authentication method of claim 17, wherein if the at least one isolated word of the utterance does not match any of the plurality of isolated words in the utterance database, then a new key is added to the hashmap and the at least one acoustic characteristic of the new key is added to the 2-D array; and wherein if the at least one isolated word of the utterance matches one of the plurality of isolated words, and the at least one acoustic characteristic of the at least one isolated word of the utterance does not match any of the at least one acoustic characteristic associated with the plurality of isolated words, then the at least one acoustic characteristic of the at least one isolated word of the utterance is added to the row of distinct occurrences of the 2-D array for the matched at least one isolated word.

24. A transaction authentication method comprising:
identifying at least one speaker using a unique speaker identifier provided to the at least one speaker when the at least one speaker enrolls in the transaction authentication method;

selecting at least one prior utterance of the at least one speaker stored in at least one utterance database;

outputting at least one audible voice generated version of the selected at least one prior utterance of the at least one speaker;

recording at least one reproduction by the at least one speaker of the at least one audible voice generated version of the at least one prior utterance of the at least one speaker;

analyzing the at least one reproduction by at least one statistical model, at least one acoustic analysis, or any combination thereof to identify at least one isolated word, at least one acoustic characteristic, or any combination thereof of the at least one reproduction of the at least one speaker, wherein the at least one isolated word of the utterance is not predefined in the utterance database;

matching the at least one isolated word of the at least one reproduction of the at least one speaker or the at least one acoustic characteristic of the at least one reproduction of the at least one speaker, or any combination thereof, of the at least one speaker with at least one word of at least one prior utterance of the at least one speaker stored in the at least one utterance database based on at least one predefined accuracy criterion;

wherein in response to matching the at least one isolated word of the at least one reproduction with the at least one word of the at least one prior utterance based on the at least one predefined accuracy criterion, determining that the at least one reproduction of the at least one speaker does or does not match the at least one prior utterance of the at least one speaker; and in response to making the match determination, transmitting an authentication message in response that the at least one reproduction does or does not match the at least one prior utterance by the at least one speaker and add the at least one isolated word of the at least one reproduction to the utterance database, wherein the utterance database comprises a repository that combines a hashmap and a 2-D array, wherein the hashmap maintains key and value pairs in which a key represents the at least one isolated word from a plurality of isolated words, and the 2-D array comprises a row of distinct occurrences of the at least one isolated word and the at least one acoustic characteristic associated with the at least one isolated word.

25. The transaction authentication method of claim 24, wherein the at least one acoustic analysis comprises a phonetic analysis using an analog-to-digital converter to identify phone or phonemes comprising an utterance.

26. The transaction authentication method of claim 24, wherein the at least one acoustic analysis comprises an acoustic amplitude analysis, a phonetic analysis, an amplitude analysis, a temporal analysis, an energy analysis, a waveform analysis, a spatial frequency analysis, or any combination thereof.

27. The transaction authentication method of claim 24, wherein the utterance is compared with the at least one speaker's utterance based only on results of the at least one statistical model, the at least one acoustic analysis, or any combination thereof.

28. The transaction authentication method of claim 24, wherein the at least one statistical model comprises a Markov model, a deep neural network, a language model, a Bayesian non-parametric model, or any combination thereof.

29. The transaction authentication method of claim 24, wherein the at least one statistical model incorporates a beads-on-a-string model.

30. The transaction authentication method of claim 24, wherein if the at least one isolated word of the at least one reproduction does not match any of the plurality of isolated words in the utterance database, then a new key is added to the hashmap and the at least one acoustic characteristic of the new key is added to the 2-D array; and wherein if the at least one isolated word of the at least one reproduction matches one of the plurality of isolated words, and the at least one acoustic characteristic of the at least one isolated word of the at least one reproduction does not match any of the at least one acoustic characteristic associated with the plurality of isolated words, then the at least one acoustic characteristic of the at least one isolated word of the at least one reproduction is added to the row of distinct occurrences of the 2-D array for the matched at least one isolated word.

31. The transaction authentication method of claim 24, wherein the isolated words comprising the at least one reproduction are output by a voice generation device in at least one non-grammatical order, random order, otherwise non-sequential order, or any combination thereof.

32. The transaction authentication method of claim 24, wherein the at least one reproduction must be made within at least one predefined time interval.

\* \* \* \* \*

UNITED STATES PATENT AND TRADEMARK OFFICE
CERTIFICATE OF CORRECTION

PATENT NO. : 10,957,318 B2  
APPLICATION NO. : 16/179041  
DATED : March 23, 2021  
INVENTOR(S) : Arjun Mishra et al.

Page 1 of 1

It is certified that error appears in the above-identified patent and that said Letters Patent is hereby corrected as shown below:

On the Title Page

Column 2, item (57), Abstract, Line 8, delete "he" and insert -- the --

Column 2, item (57), Abstract, Line 9, delete "thereof;" and insert -- of; --

In the Claims

Column 16, Line 22, Claim 1, delete "a least" and insert -- at least --

Column 17, Line 2, Claim 4, after "the" delete "new"

Column 17, Line 31, Claim 8, delete "a least" and insert -- at least --

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*